No. 683,482.  
Patented Oct. 1, 1901.  
H. F. NEUMEYER.  
HOSE COUPLING.  
(Application filed July 23, 1901.)

(No Model.)

Horace F. Neumeyer, Inventor:

Witnesses  
Howard D. Orr.

By  
Attorney

UNITED STATES PATENT OFFICE.

HORACE FALK NEUMEYER, OF MACUNGIE, PENNSYLVANIA.

HOSE-COUPLING.

SPECIFICATION forming part of Letters Patent No. 683,482, dated October 1, 1901.

Application filed July 23, 1901. Serial No. 69,404. (No model.)

*To all whom it may concern:*

Be it known that I, HORACE FALK NEUMEYER, a citizen of the United States, residing at Macungie, in the county of Lehigh and State of Pennsylvania, have invented a new and useful Hose-Coupling, of which the following is a specification.

This invention relates to means for connecting a hose-section to a metallic part—as, for instance, a tubular coupling member.

Considerable difficulty has been heretofore experienced in maintaining a water-tight and durable joint between a flexible hose and a stiff metallic pipe, coupling, or the like, as the water-pressure soon spreads and bulges the hose, and thereby loosens the connection thereof with the pipe, whereby a leak results. In view of this disadvantage it is the object of the present invention to provide for overcoming the tendency of the hose to loosen the joint usually occasioned through the bulging of the hose by the water-pressure, and thereby to effectually prevent leakage and insure an effective connection for the hose. It is furthermore designed to facilitate the coupling or connecting of a flexible hose-section to a metallic part and to insure a durable water-tight joint after the completion of the coupling.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
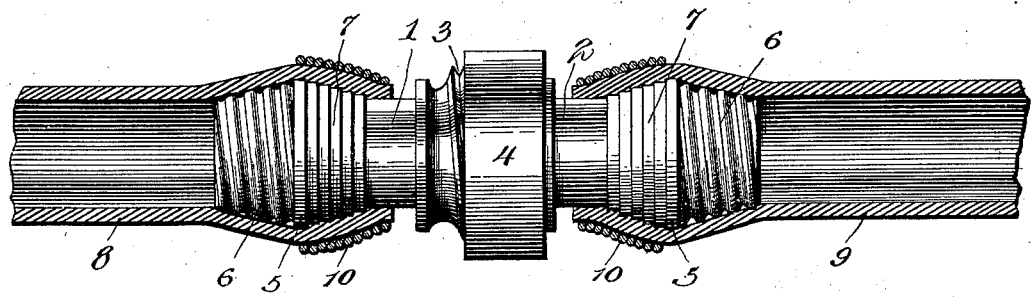
Figure 2:
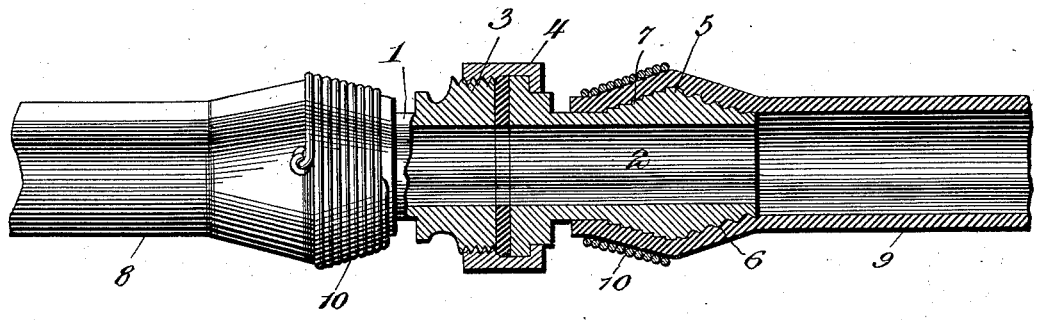
Figure 3:
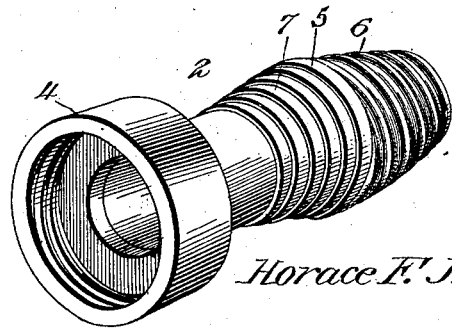

In the drawings, Figure 1 is a side elevation of a hose-coupling embodying the present invention, parts of the hose being broken away to disclose the connection between the coupling and said hose-sections. Fig. 2 is a longitudinal sectional view thereof, one end being in elevation. Fig. 3 is a detail perspective view of one of the coupling members.

Like characters of reference designate corresponding parts in all of the figures of the drawings.

Referring to the accompanying drawings, 1 and 2 designate, respectively, the opposite tubular members of a pipe-coupling, of which the member 1 has its inner end somewhat enlarged and externally screw-threaded, as at 3, while the inner end of the other member is provided with an internally-screw-threaded collar 4, which is swiveled upon said member and designed to engage the adjacent screw-threaded end of the first-mentioned member, so as to draw together the two members.

The intermediate portion of each coupling member is provided with an external smooth cylindrical portion 5, from which the member is tapered in opposite directions, so as to decrease in external diameter. The outer tapered portion is provided with a relatively coarse screw-thread 6, which leads inwardly from the outer end of the member and merges into the intermediate smooth cylindrical portion, said screw-thread having a rounded outer edge, so as to obviate damage to the hose. The inner beveled portion of each member is provided with a series of stepped marginal flanges 7, which decrease in diameter from the intermediate cylindrical portion and have smooth outer faces and sharp marginal edges.

In applying either hose-section 8 or 9 to the adjacent coupling member it is screwed upon the threaded portion thereof until the end of the section passes over the intermediate smooth cylindrical portion 5 and is projected beyond the same, so that the projected end portion of the hose snugly embraces the stepped flanges 7 by reason of the elastic nature of the hose, after which suitable binding means 10 is wrapped about that portion of the hose which embraces the stepped flanges, so as to insure a positive engagement of the hose with said flanged portion of the coupling member. It will be noted that the cylindrical portion 5 is at the greatest external diameter of the coupling member, thereby forming a tight joint at its point between the member and the hose, the latter being contracted in rear of the cylindrical portion and snugly engaging the flanged portion, so as to effectually prevent endwise displacement of the hose from the coupling member. It will here be noted that any bulging of the hose by reason of the water-pressure will not loosen or otherwise affect the connection between the coupling member and the hose, as such connection is at a considerable distance from the outer end of the coupling member.

It is preferred to have the outer beveled end of the coupling member provided with screw-threads rather than to be smooth, as the screw-threaded connection materially facilitates the engagement of the hose with the coupling member, and by having rounded or smooth screw-threads no damage results to the hose.

It will be understood that the real connection between the coupling member and the hose is obtained through the engagement of the inner walls of the hose with the comparatively sharp edges of the stepped series of marginal flanges which bite into the hose, and thereby effectually prevent endwise displacement thereof. Heretofore a somewhat similar connection has been provided by means of screw-threads; but such a connection soon results in the loosening of the hose, as the latter will become accidentally unscrewed through the ordinary handling thereof. By providing a plurality of marginal flanges which are arranged in a stepped series and having each flange separate and distinct from the other in contradistinction to a continuous spiral flange, as presented by a screw-thread, it is impossible for the hose to become displaced should it turn upon said shoulders, as will be readily understood.

From the foregoing description it will be apparent that the present invention combines a screw-threaded portion with a marginal flanged portion, having the flanges arranged in a stepped series, the screw-threaded portion being designed to facilitate the assembling of the coupling and a hose and the step-flanges to insure an effective connection between the coupling and the hose.

Although I have shown and described the present invention for connecting opposite hose-sections by means of a metallic coupling, it will be understood that the essential object of the invention is to provide for coupling a flexible hose-section to a stiff or metallic member, and therefore I do not wish to be understood as limiting myself to the single application of the device as shown in the drawings, for the general principle of the invention may be applied in connecting a hose to a metal pipe or any other similar element.

What I claim is—

1. A pipe-coupling, having an externally-tapered end portion which is screw-threaded, and an adjacent reversely-tapered portion which is provided with a stepped series of marginal flanges which decrease in diameter from the screw-threaded portion toward the opposite end of the coupling.

2. A hose-coupling, consisting of a tubular member, having reversely-tapered portions, and a smooth, cylindrical portion lying between the tapered portions and separating the same, one of the tapered portions being provided with smooth coarse screw-threads leading to the adjacent edge of the intermediate cylindrical portion, and the opposite tapered portion being provided with a stepped series of marginal shoulders decreasing in diameter from the cylindrical intermediate portion, each flange being complete in itself and separate from the other flanges and having a comparatively sharp marginal edge.

3. The combination of a coupling member having a tapered terminal provided with an external screw-thread, an inner stepped series of marginal flanges each decreasing in diameter from the screw-threaded portion, there being a smooth, cylindrical portion lying between and separating the screw-threaded part and the series of flanges, a hose fitted to the coupling member and snugly embracing the cylindrical portion, and the flanged portion and a band element snugly embracing the hose at that portion which embraces the flanges.

4. A pipe-coupling member consisting of an open-ended tube having one end tapered and provided with a coarse rounded screw-thread, an external stepped series of marginal flanges located between the said tapered portion and the opposite end of the tube, there being an intermediate smooth cylindrical portion between the flanges and the screw-threaded portion, and a coupling element carried by that end of the tube which is opposite the screw-threaded end thereof.

In testimony that I claim the foregoing as my own I have hereto affixed my signature in the presence of two witnesses.

HORACE FALK NEUMEYER.

Witnesses:
  FREDK. R. BOUSCH,
  BLANCHE E. NAGLE.